(12) United States Patent
Vasudevan et al.

(10) Patent No.: US 10,601,355 B2
(45) Date of Patent: Mar. 24, 2020

(54) CLOSED-LOOP CONTROL OF LINEAR RESONANT ACTUATOR USING BACK EMF AND INERTIAL COMPENSATION

(71) Applicant: Apple Inc., Cupertino, CA (US)

(72) Inventors: Hari Vasudevan, Los Gatos, CA (US); Eileen A. Mazzochette, Saratoga, CA (US); Arman Hajati, Santa Clara, CA (US); Shingo Yoneoka, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/147,434

(22) Filed: Sep. 28, 2018

(65) Prior Publication Data

US 2019/0103829 A1  Apr. 4, 2019

Related U.S. Application Data

(60) Provisional application No. 62/566,226, filed on Sep. 29, 2017.

(51) Int. Cl.
| | |
|---|---|
| *H02K 33/00* | (2006.01) |
| *H02P 25/034* | (2016.01) |
| *H02P 23/12* | (2006.01) |
| *H02P 23/14* | (2006.01) |
| *G06F 3/01* | (2006.01) |
| *H02K 29/12* | (2006.01) |
| *H02K 33/18* | (2006.01) |
| *H02K 29/08* | (2006.01) |
| *H02P 29/60* | (2016.01) |

(52) U.S. Cl.
CPC ............ *H02P 25/034* (2016.02); *G06F 3/016* (2013.01); *H02K 29/08* (2013.01); *H02K 29/12* (2013.01); *H02K 33/18* (2013.01); *H02P 23/12* (2013.01); *H02P 23/14* (2013.01); *H02P 29/60* (2016.02)

(58) Field of Classification Search
CPC ......... H02P 25/032; H02P 6/182; H02P 25/08
See application file for complete search history.

(56) References Cited

U.S. PATENT DOCUMENTS

| | | |
|---|---|---|
| 7,268,503 B2 | 9/2007 | Yamasaki et al. |
| 9,524,624 B2 | 12/2016 | Rank et al. |
| 9,746,923 B2 | 8/2017 | Cruz-Hernandez et al. |

(Continued)

FOREIGN PATENT DOCUMENTS

WO   WO 1998014033   4/1998

OTHER PUBLICATIONS

[No Author] "High-Efficiency, Low-Noise Audio Subsystem," Maxim Innovation Delivered, 2011, 48 pages.

(Continued)

*Primary Examiner* — Karen Masih
(74) *Attorney, Agent, or Firm* — Fish & Richardson P.C.

(57) ABSTRACT

A system for providing closed-loop control of a linear resonant actuator using Back Electromotive Force (EMF) and inertial compensation is disclosed. In an embodiment, one or more inertial sensors are used to estimate low frequency motion of a haptic engine moving mass and compensate for the motion using a feedforward model, thus providing a more robust closed-loop control system for controlling the moving mass when subjected to low frequency disturbances by a user, for example, shaking or swinging the device.

20 Claims, 8 Drawing Sheets

(56) References Cited

U.S. PATENT DOCUMENTS

| | | |
|---|---|---|
| 9,764,357 B2 | 9/2017 | Houston |
| 9,802,225 B2 | 10/2017 | Houston et al. |
| 2010/0153845 A1 | 6/2010 | Gregorio et al. |
| 2012/0229264 A1 | 9/2012 | Company Bosch et al. |
| 2017/0053502 A1 | 2/2017 | Shah |
| 2017/0090574 A1 | 3/2017 | Baer et al. |
| 2017/0093318 A1 | 3/2017 | Ge et al. |
| 2017/0169674 A1 | 6/2017 | Macours |
| 2017/0182517 A9 | 6/2017 | Houston et al. |
| 2018/0316296 A1 | 11/2018 | Hajati et al. |
| 2019/0235629 A1* | 8/2019 | Hu .......................... H01L 41/09 |

OTHER PUBLICATIONS

[No Author] "Microphone Preamplifier with Variable Compression and Noise Gating," Analog Devices, Data Sheet SSM2166, 1996-2016, 14 pages.

Honda et al., "Application Note AN-1071," Class D Audio Amplifier Basics, International IOR Rectifier, 2005, 14 pages.

Nicoletti "Audio amplifier basics: Select the best topology for your design," EE Times—Connecting the global Electronics Community, Apr. 24, 2013, 6 pages.

* cited by examiner

CLOSED-LOOP CONTROL OF LINEAR RESONANT ACTUATOR USING BACK EMF AND INERTIAL COMPENSATION

CROSS-RELATED APPLICATION

This application claims the benefit of priority of U.S. Provisional Patent Application No. 62/566,226, filed Sep. 29, 2017, for "Closed-Loop Control of Linear Resonant Actuator Using Back EMF and Inertial Compensation," which provisional patent application is incorporated by reference herein in its entirety.

TECHNICAL FIELD

This disclosure relates generally to controlling linear resonant actuators, such as haptic engines.

BACKGROUND

Some mobile devices (e.g., smart phones) include a haptic engine that is configured to provide a tactile sensation such as a vibration to a user touching or holding the mobile device. The haptic engine is a linear resonant actuator (LRA) that is mechanically connected to an input surface of the mobile device. Drive electronics coupled to the LRA cause the LRA to induce vibration which is transferred to the input surface so that the vibration can be felt by a user who is touching or holding the mobile device.

SUMMARY

A system for providing closed-loop control of a linear resonant actuator using Back Electromotive Force (EMF) and inertial compensation is disclosed.

In an embodiment, a system for providing closed-loop control of a linear resonant actuator comprises: a linear resonant actuator (LRA) including a frame, one or more coils mounted to the frame and operable to generate a magnetic field, and a mass including magnetic portions positioned within the frame and configured to move within the frame along a movement axis; drive electronics coupled to the linear resonant actuator (LRA) and to the one or more coils; one or more inertial sensors; a closed-loop controller coupled to the one or more inertial sensors and the drive electronics, the controller configured to: estimate a coil resistance of the one or more coils; compute an estimated linear acceleration of the moving mass based on signals from the one or more inertial sensors; compute a disturbance rejection feedforward compensation signal based on the estimated linear acceleration, the estimated coil resistance and a motor constant; compute a position feedforward compensation signal based on a reference position of the mass; compute an estimated velocity of the moving mass based on output signals of the drive electronics and the estimated coil resistance; compute an actuator control signal based on a difference between the estimated mass velocity and a reference mass velocity; compute a compensated actuator control signal by compensating the actuator control signal with the disturbance rejection feedforward compensation signal and the position feedforward compensation signal; and provide the compensated actuator control signal to the drive electronics, the compensated actuator signal causing the drive electronics to adjust coil current in the one or more coils.

In an embodiment, a method of providing closed-loop control of a linear resonant actuator comprises: estimating, by a closed-loop controller, a coil resistance for one or more coils of a linear resonant actuator (LRA); computing, by the closed-loop controller, an estimated linear acceleration of a moving mass in the LRA based on signals from the one or more inertial sensors; computing, by the closed-loop controller, a disturbance rejection feedforward compensation signal based on the estimated linear acceleration, the estimated coil resistance and a motor constant; computing, by the closed-loop controller, a position feedforward compensation signal based on a reference position of the mass; computing, by the closed-loop controller, an estimated velocity of the moving mass based on output signals of drive electronics coupled to the one or more coils, and the estimated coil resistance; computing, by the closed-loop controller, an actuator control signal based on a difference between the estimated mass velocity and a reference mass velocity; computing, by the closed-loop controller, a compensated actuator control signal by compensating the actuator control signal with the disturbance rejection feedforward compensation signal and the position feedforward compensation signal; and providing, by the closed-loop controller, the compensated actuator control signal to the drive electronics, the compensated actuator signal causing the drive electronics to adjust coil current in the one or more coils.

Particular embodiments disclosed herein provide one or more of the following advantages. One or more inertial sensors are used to estimate low frequency motion of a haptic engine moving mass and compensate for the motion using a feedforward model, thus providing a more robust closed-loop control system for controlling the moving mass when subjected to low frequency disturbances by a user, for example, shaking or swinging the device.

The details of the disclosed implementations are set forth in the accompanying drawings and the description below. Other features, objects and advantages are apparent from the description, drawings and claims.

DETAILED DESCRIPTION

A LRA (e.g., a haptic engine) includes a mass positioned in a housing that is driven to move or oscillate to induce a vibratory response. A magnetic field sensor is included in the housing that varies its output voltage in response to changes in a magnetic field as the mass moves along a movement axis within the housing. The output voltage is used by a closed-loop control application to estimate position and velocity of the mass on the movement axis. The closed-loop control application estimates the position and velocity of the mass to avoid a crash, to minimize variations over a population of haptic engines, and provides a crisper haptic feedback by reducing unwanted oscillation by minimizing the LRA's ring down.

The mass position is estimated by integrating a back electromotive force (EMF) voltage (which provides an approximation of the mass velocity) and using one or more magnetic field sensors (e.g., one or more Hall sensors) to estimate low frequency motion/drift of the mass. Using sensor fusion, high-pass filtered back EMF data is combined with low-pass filtered analog output of a magnetic sensor using a discrete time, state space observer (e.g., a Kalman filter implemented in software) to obtain a reliable and high-quality estimate of the moving mass position and velocity. The high-quality estimation of mass position and velocity can be used by a closed-loop control application to generate actuator control signals for controlling a power amplifier (e.g., controlling the duty-cycle) used to drive current in the coils and thus control the motion of the mass on a movement axis.

Additionally, the temperature of the analog magnetic field sensor is used with a thermal model to estimate coil resistance. The estimated coil resistance can be combined by the observer in the digital domain with the high-pass filtered Back EMF data and the low-pass filtered magnetic field sensor output to provide a reliable and high-quality estimate of the mass position and velocity. The discrete time, state space observer and back EMF and thermal models can be implemented in the digital domain using any system processor, including a processor that is already performing other system tasks (e.g., an audio DSP or system-on-chip (SOC)). By directly coupling the output of the magnetic field sensor to the system processor using analog channels (e.g., circuit traces, wires), the number of hardware components in the LRA can be reduced to save cost.

Example System

Figure 1A:
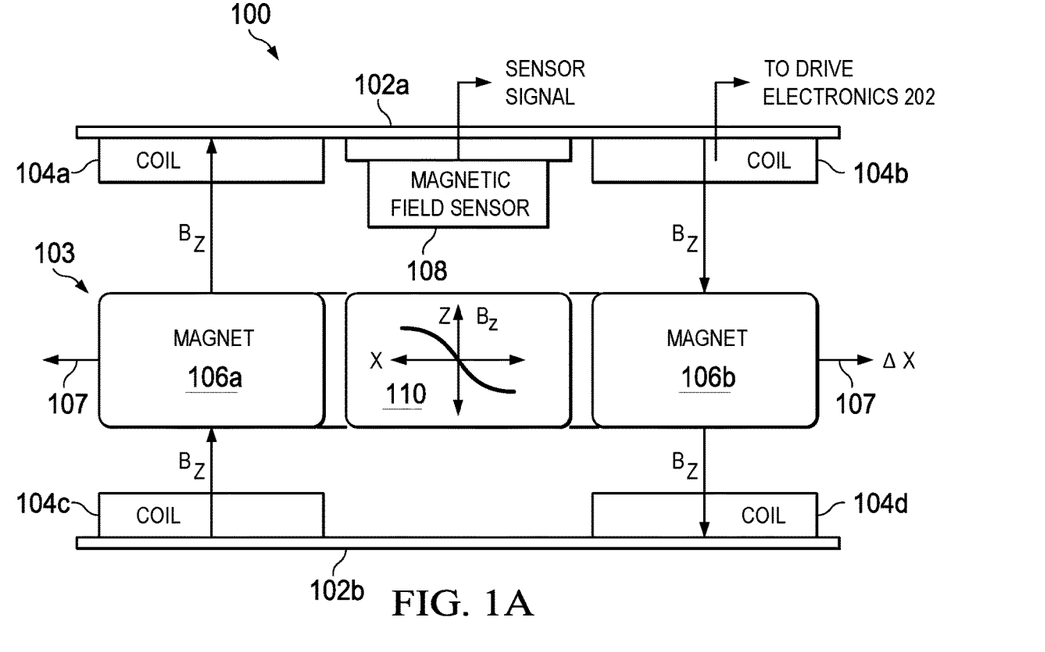
FIG. 1A is a cross-sectional view of an example double-sided, moving magnet LRA, according to an embodiment.

FIG. 1A is a cross-sectional view of an example double-sided, moving magnet LRA 100, according to an embodiment. LRA 100 includes coils 104a-104d mounted to opposing housing portions 102a, 102b. Mass 103 is positioned within a housing that includes portions 102a, 102b. Mass 103 can be mechanically constrained (e.g., constrained by a shaft and/or other mechanical guides or by a stiff suspension using flexures) to move linearly along movement axis 107 (x-axis) in two directions. Mass 103 includes magnets 106a, 106b. Magnetic field sensor 108 (e.g., a Hall sensor) is mounted on a flexible printed circuit (FPC) which is attached to portion 102a. Although magnetic field sensor 108 is shown mounted to portion 102a (e.g., the top of the housing), in another embodiment magnetic field sensor 108 could be mounted to portion 102b (e.g., the bottom of the housing). In another embodiment, there can be two or more opposing magnetic sensors 108 mounted to portions 102a, 102b for controlling z-axis motion of the mass within the housing.

When LRA 100 is in operation, an alternating current that is provided through coils 104a-104d causes a Lorentz force that drives mass 103 along movement axis 107 in two directions about a magnetic reference (e.g., magnetic zero reference), which is illustrated by graph 110 for discussion purposes. A position Δx of mass 103 on movement axis 107 is a function of the amplitude and frequency of the current flowing through coils 104a-104d. In the example configuration shown, coils 104a-104d and magnets 106a, 106b are used to drive mass 103 along movement axis 107 and to sense the position of mass 103 on movement axis 107.

The position of mass 103 on movement axis 107 an be estimated by integrating a back EMF voltage ($V_{bEMF}$) that is generated by coils 104a-104d. The back EMF voltage pushes against the current flowing in coils 104a-104d, which induces the back EMF voltage. The back EMF voltage, $V_{bemf}$, is not directly observable but can be reconstructed. For a LRA, $V_{bemf}$ is given by Equation [1]:

$$V_{bemf}(t) = V_{act}(t) - (R_{act}(t) \ast i_{act}(t) + L_{act}(t) \ast i'_{act}(t)), \quad [1]$$

where $V_{act}(t)$ is the actuator voltage, $R_{act}(t)$ is the actuator resistance, $L_{act}(t)$ is the actuator inductance, $i_{act}(t)$ is the actuator current, and $i'_{act}(t)$ is the time derivative of the actuator current. The actuator resistance $R_{act}(t)$ and inductance $L_{act}(t)$ can be estimated in real-time by applying a small (e.g., 80 mV) background voltage signal at either very high (e.g. 2 kHz) or very low frequencies (e.g. 20 Hz) where the actuator is known to have virtually no position response (e.g., <10 um). The velocity of the actuator is proportional to $V_{bemf}(t)$. Using back EMF voltage to estimate position of mass 103 is prone to errors due to the resistance $R_{act}(t)$ estimation and the inability of the control application to sense a low-velocity drift that is caused by inertial disturbances.

In an embodiment, magnetic field sensor 108 generates an analog sensor signal (e.g., a voltage signal) that varies in response to a magnetic field in LRA 100 and an analog sensor signal which varies in response to a temperature change of magnetic field sensor 108. Additionally, coils 104a-104d are coupled to drive electronics 202, as described in reference to FIG. 2.

Figure 1B:
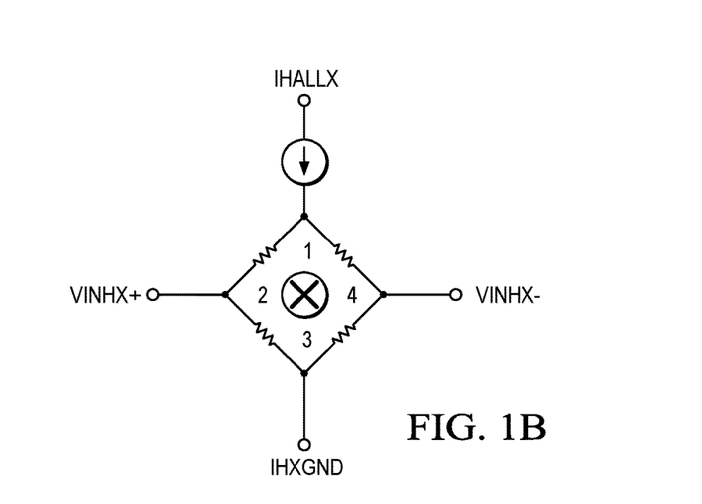
FIG. 1B is a schematic diagram of an example magnetic field sensor, according to an embodiment.

FIG. 1B is a schematic diagram of an example magnetic field sensor 108. In the example shown, magnetic field sensor 108 is a Hall sensor. The Hall sensor behaves like a Wheatstone bridge. When driven by a current source ($I_{HALLX}$), a differential output Hall voltage $V_{INHX}$ ($V_B$) is proportional to the magnetic field ($B_Z$) and the current source $I_{HALLX}$. The voltage at the $I_{HALLX}$ node ($V_R$) is proportional to the Hall sensor resistance which is a proxy for its temperature.

Figure 2:
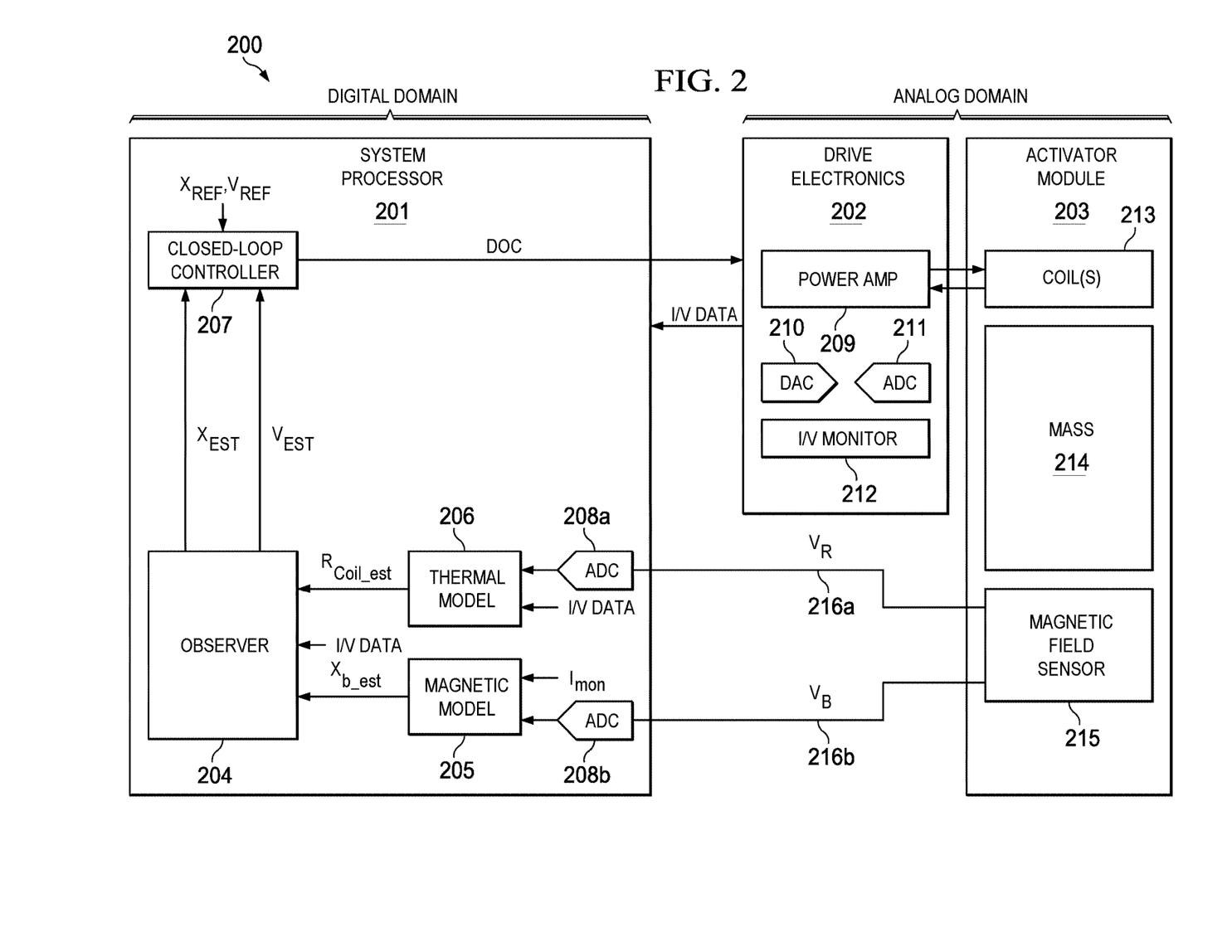
FIG. 2 is a block diagram of a closed-loop LRA control system, according to an embodiment.

FIG. 2 is a block diagram of a closed-loop LRA control system 200, according to an embodiment. System 200 includes system processor 201, LRA drive electronics 202 and LRA module 203. System processor 201 further includes observer 204, magnetic model 205, thermal model 206, closed-loop controller 207 and ADCs 208a, 208b. Drive electronics 202 further includes power amplifier 209, DAC 210, ADC 211 and I/V monitor 212. LRA module 203 further includes coils 213, mass 214 and magnetic field sensor 215.

System 200 is an example embodiment and other embodiments can include more or fewer components. For example, system 200 can include additional magnetic field sensors. A practical implementation of system 200 can include other components that have been removed from FIG. 2 for clarity, including but not limited to: thermal protection circuitry, power supply circuitry, circuitry for generating controller set points, memory, communication buses (e.g., SPI, I2C serial buses), filters, logic, clock generators, hot bars, flex circuits, etc. In an embodiment, system processor 201 and drive electronics 202 can be separate IC chips or embedded together in a single system-in-package (SiP). The SiP can be embedded in another system or device, such as, for example, a smartphone, tablet computer, wearable computer (e.g., a smartwatch) or any other electronic device that uses an LRA module for haptic feedback.

System processor 201 can be any processor that can execute software instructions to perform operations, including but not limited to: a microprocessor (single core or multi-core), DSP chip, microcontroller, FPGA, ASIC and hardware controller. In an embodiment, system processor 201 can perform other system tasks including, for example, audio processing tasks. System processor 201 receives analog signals directly from magnetic field sensor 215 over analog channels 216a, 216b. Analog channels 216a, 216b can be circuit traces or wires. In an embodiment, system processor 201 also receives I/V data from drive electronics 202. The I/V data is obtained by I/V monitoring 212. The I/V data is the actuator current $I_{act}(t)$ and actuator voltage $V_{act}(t)$, which has been converted to digital signals by ADC 211 in drive electronics 202.

The analog signals $V_R$, $V_B$ output by magnetic sensor 215 are converted to digital signals using ADCs 208a, 208b. For example, $V_R$ is converted to a first digital signal by ADC 208a. $V_R$ is an analog voltage signal that varies in response to a change in thermal resistance due to a change in temperature of magnetic field sensor 215. The first digital signal is input into thermal model 206 together with the I/V data. The I/V data can be transferred to system processor 201 using any suitable interface module (e.g., I2C, I2S, SPI or SoundWire® serial interface).

Thermal model 206 is implemented in software and provides an estimate of the resistance of coil 213 resistance ($R_{coil\_est}$) in LRA module 203. The resistance $R_{coil\_est}$ is used to determine mass velocity and is represented as $R_{act}(t)$ in Equation [1] in the analog domain. The resistance $R_{coil\_est}$ is input into observer 204 together with I/V data and a first estimate $X_{b\_est}$ of mass position output by magnetic model 205. Magnetic model 205 calculates $X_{b\_est}$ est based on I/V data and $V_B$ (e.g., the Hall voltage), which is converted to a digital signal by ADC 216b before being used by back EMF model 205.

In an embodiment, magnetic model 205 provides a coarse estimate of mass position $X_{b\_est}$ based on the coil current $I_{mon}$ and the Hall voltage $V_B$, where $V_B$ is calculated using Equation [2]:

$$V_B = f(x) + c * I_{mon}, \qquad [2]$$

where f(x) and c are factors that are estimated or calibrated. Moving mass 214 (a moving magnet) generates a magnetic field ($B_Z$) which is a nonlinear function of its position X in magnetic field sensor 215. In addition, coils 213 induce a magnetic field proportional to the current into magnetic field sensor 215. Therefore, the voltage $V_B$ sensed by magnetic field sensor 215 is a nonlinear function f(x) of the position X, plus a scaled version of the coil current, $c * I_{mon}$. Magnetic model 205 uses these factors to estimate the position $X_{b\_est}$ based on $V_B$ and $I_{mon}$, given by Equation [3]:

$$X_{b\_est} = f^{-1}(V_B - c * I_{mon}), \qquad [3]$$

where $f^{-1}$ is an inverse of the nonlinear function f(x) that is measured and calibrated experimentally for each LRA module and stored in a look-up table in controller 207.

Observer 204 receives as input $R_{coil\_est}$, I/V data and $X_{b\_est}$ and outputs a more reliable, higher quality mass position $X_{est}$ and mass velocity $V_{est}$. In an embodiment, observer 204 is a Kalman filter, which takes as measurements or observations the course estimate of mass position $X_{b\_est}$ est and the actuator current I from the I/V data. An example formulation of a Kalman filter for a LRA is disclosed in APPENDIX A.

Closed-loop controller 207 receives as inputs the filtered estimates of mass position and mass velocity ($X_{est}$, $V_{est}$) and a setpoint or reference mass position and velocity ($X_{Ref}$, $V_{Ref}$), and outputs an actuator control signal. In an embodiment, controller 207 also receives a disturbance rejection feedforward voltage signal $V_{Act\_Comp}$ for controlling the moving mass when subjected to low frequency disturbances by a user, for example, by the user shaking or swinging the device, as described in further detail in reference to FIGS. 7A-7D and FIG. 8.

Controller 207 can implement any desired control law. In an embodiment, controller 207 includes a feedforward component for rapid response and feedback component to compensate for errors in the plant model. An example suitable controller 207 is a proportional-integral-derivative (PID) controller that continuously calculates an error value as the difference between the desired set point ($X_{Ref}$, $V_{Ref}$) and the measured process variables ($X_{est}$, $V_{est}$). Other controllers can also be used that have more or less complexity, including P controllers, PI controllers, or PD controllers. In another embodiment, a state-space observer is used as a state feedback path in addition to a feedforward path. The feedback control command is $u = KX = k_1 * x_1 + k_2 * x_2$, where $x_1$ and $x_2$ are the estimated position and velocity states, respectively. In another embodiment, the feedback u is a non-linear function of the states, $u = g(x,t)$, such as a sliding-mode control.

The actuator control signal can be a digital command output in pulse code modulation (PCM), pulse width modulation (PWM), pulse density modulation (PDM), etc. The PWM is coupled to drive electronics 202 and is used to control the duty-cycle of power amplifier 209 (e.g., a power converter). By changing the PWM signal, power amplifier 209 can control how much current is injected into coils 213 and therefore control the movement of mass 214 along a movement axis. The more accurate the measured process variables ($X_{est}$, $V_{est}$) the more accurate the PWM signal, and the more accurate the PWM signal, the more accurate the control of mass 214.

Figure 3:
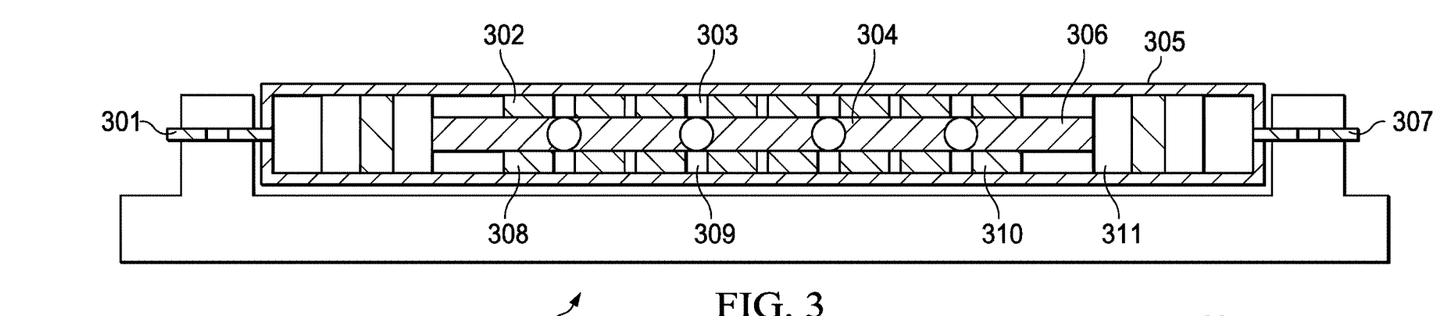
FIG. 3 is perspective view of an example double-sided, moving magnet LRA with a single bottom magnetic field sensor, according to an embodiment.

An advantage of system 200 is that the AFE electronics that are typically located in conventional LRA modules is removed from LRA module 203 and the analog output signals from magnetic field sensor 215 are coupled directly to system processor 201. Although the analog output signals may be noisy due to the distance the signals have to travel on analog channels 216a, 216b, the high-frequency noise is mitigated by observer 204 in the digital domain, which behaves like a low-pass filter or smoother on the magnetic field sensor signals. Accordingly, the closed-loop control system 200 allows for a reduction in unit cost of LRA module 203 due to the reduction of parts, and still meets the strict specifications for control of mass position and velocity typically required for many LRA applications, such as Haptic engine applications FIG. 3 is perspective view of an example double-sided, moving magnet LRA module 300 with a single bottom magnetic field sensor to illustrate temperature-based resistance estimation, according to an embodiment. LRA module 300 includes mounting tab 301, top coils 302, top hall sensor 303, magnets 304, cover 305, housing 306, mounting tab 307, bottom coil 308, bottom hall sensor 309, base 310 and mass 311 (e.g., tungsten mass). The function of passive components 302, 303, 304, 308, 309, 311 have been previously described with respect to FIGS. 1A and 2 and will not be described again here. LRA module 300 be used to generate the variables for thermal model 206, shown in FIG. 2.

Figure 4:
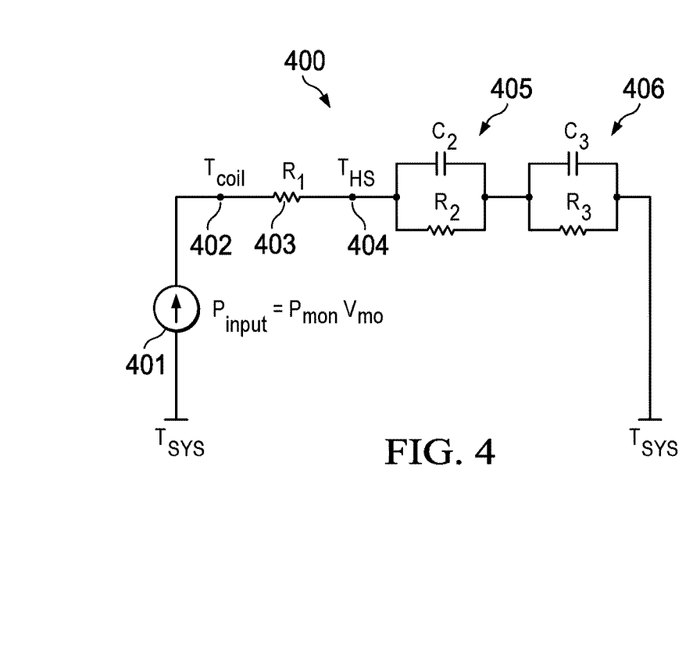
FIG. 4 is a circuit schematic illustrating a thermal model for estimating coil resistance, according an embodiment.

FIG. 4 is a model circuit representing thermal model 206 for estimating coil resistance $R_{coil\_est}$, according an embodiment. Thermal model circuit 400 includes input power 401 ($P_{input}=I_{mon}*V_{mon}$) which can be obtained from I/V data, temperature of the coil 402 ($T_{coil}$), thermal resistance 403 ($R_1$), temperature of the hall sensor 404 ($T_{HS}$), RC circuit 405 ($R_2$, $C_2$) and RC circuit 406 ($R_3$, $C_3$). $R_1$, $R_2$ are distributed thermal resistances across LRA module 300, and C2, C3 are distributed thermal masses across LRA module 300. From a thermal standpoint, LRA module 300 is a complicated distributed thermal system. However, the thermal system can be estimated as a third order lumped parameter model using thermal $R_2$, $R_3$, $C_2$ and $C_3$.

Based on thermal model 400, coil resistance $R_{coil\_est}$ can be estimated using Equations [2] and [3]:

$$T_{coil} \approx T_{HS} + R_1 I_{mon} V_{mon}, \quad [2]$$

$$R_{coil\_est} \approx \alpha T_{coil} + \beta, \quad [3]$$

where $\alpha$ and $\beta$ are estimated by calibrating the LRA module at two steady-state temperatures under hot and cold conditions, and the effective thermal resistance $R_1$ can be estimated by driving the LRA module at system-level at maximum power (for example using a vibration at a first frequency (e.g., 300 Hz)) and measuring the actual coil resistance using a super-imposed high frequency tone (e.g., 750 Hz). Since the Hall sensor and the coils are located next to each other, they have a strong thermal correlation and the temperature (and hence its resistance) of the Hall sensor is a function of the coil temperature (and hence its resistance) and the input electrical power. Therefore, we can assume that the coil resistance, $R_{coil}$, is a linear function of Hall sensor resistance, $R_{Hall}$, plus the input electrical power. To fit an experimental curve, we need to measure the $R_{coil}$ versus $R_{Hall}$ and power during a calibration process.

Example Process

Figure 5:
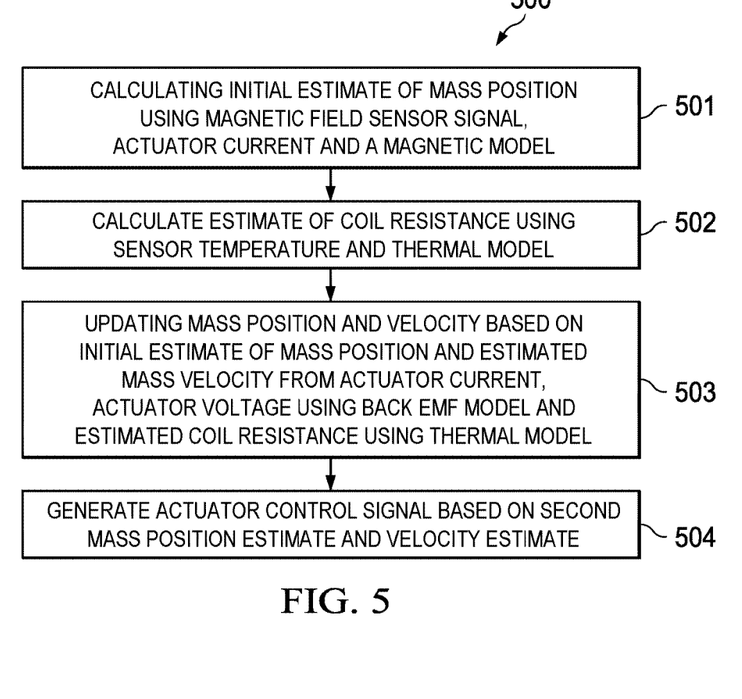
FIG. 5 is a flow diagram of an example process of estimating position and velocity of a moving mass of an LRA, according to an embodiment.

FIG. 5 is a flow diagram of an example process 500 of estimating mass position and velocity of a moving mass of an LRA as described in reference to FIGS. 1-3, according to an embodiment. Process 500 can be implemented by, for example, the mobile architecture 600 described in reference to FIG. 6.

Process 500 can begin by calculating an initial estimate of mass position using a magnetic field sensor signal, actuator current and a magnetic model (501). For example, an analog output signal from a magnetic field sensor is sent to a system processor which converts the analog output signal into a digital signal. Additionally, I/V data is obtained from a drive electronics module. The back EMF model can provide a coarse estimate of mass position using, for example, Equation [1].

Process 500 can continue by calculating an estimate of coil resistance using the temperature of the magnetic field sensor and a thermal model (502). For example, the I/V data and an analog magnetic field sensor signal from the magnetic field sensor is sent to the system processor which converts the analog output signal into a digital signal. The thermal model can provide an estimate of coil resistance using, for example, Equations [2] and [3]. In other embodiments, the magnetic field sensor signal is a digital signal.

Process 500 can continue by updating the mass position and velocity based on the initial estimate of mass position from the magnetic model and the estimated mass velocity from the actuator current, actuator voltage using a back EMF model and estimated coil resistance using a thermal model (503). For example, a discrete time, state space observer can be used to combine the initial estimate of mass position, the estimated coil resistance and I/V data to produce more reliable and higher quality mass position and velocity estimates. An example observer is a Kalman filter. An example Kalman filter formulation for LRA is described in APPENDIX A.

Process 500 can continue by generating an actuator control signal based on the second estimated mass position and estimated velocity (504). For example, the second estimated mass position and estimated velocity can be provided as plant measurements or observations to a closed-loop controller implemented in the system processor. The controller can be, for example, a full-state feedback or sliding-mode controller. The controller generates a digital command output (DCO), which is used to control the duty-cycle of a power amplifier in driver electronics. The estimated mass position and velocity enable the controller to generate an appropriate DCO signal. Responsive to the DCO signal, the power amplifier controls the flow of actuator current into the coils of an LRA module to control the motion of the mass of the LRA module, which is sensed by reconstruction of the back EMF produced by the coils and the analog output signal of a magnetic field sensor, thereby creating closed-loop control system for the LRA module.

Example Device Architecture

Figure 6:
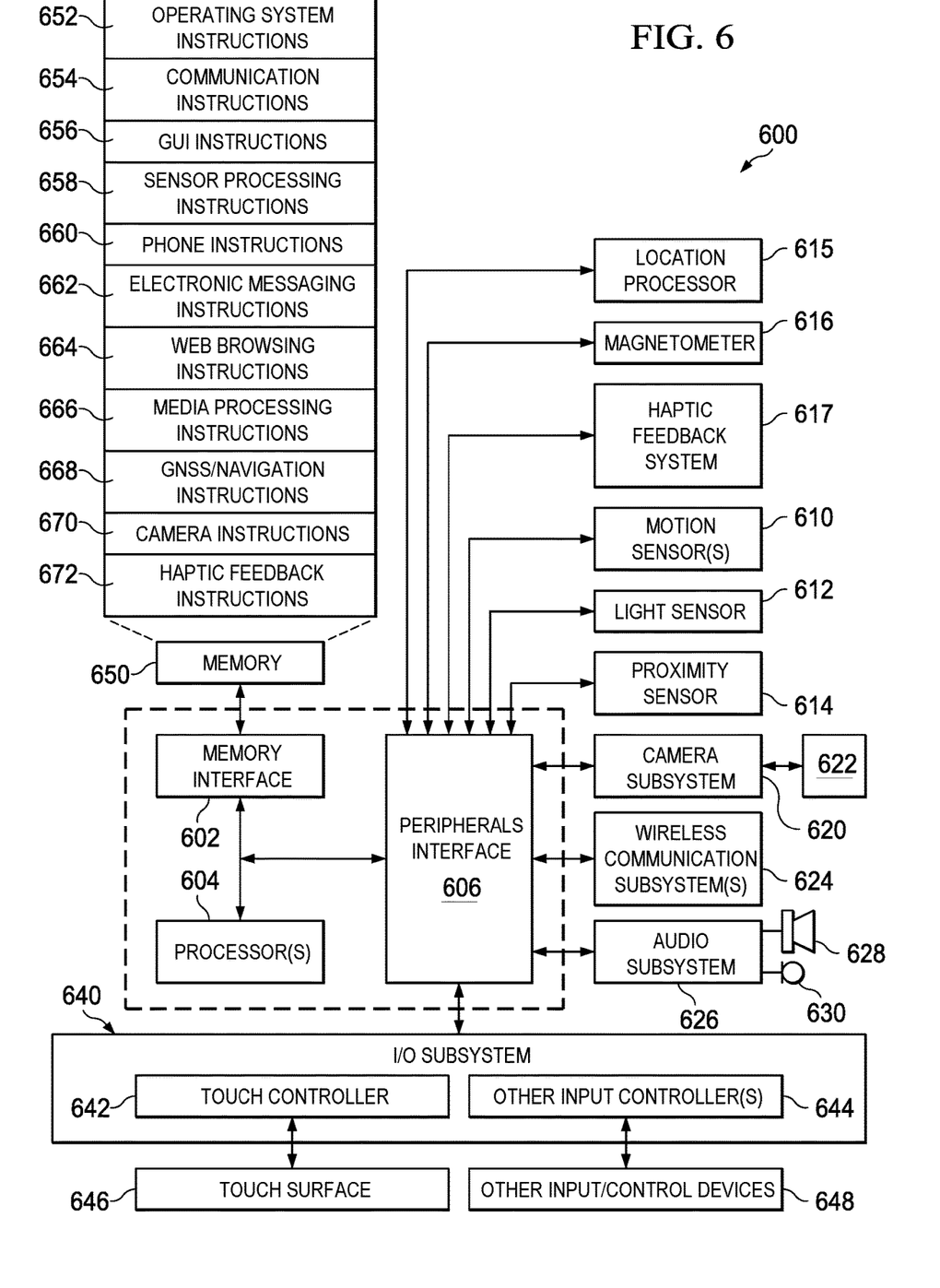
FIG. 6 is a diagram of an example mobile device architecture that uses a haptic engine as described in reference to FIGS. 1-5, according to an embodiment.

FIG. 6 is a diagram of an example mobile device architecture that uses one of the haptic engines described in reference to FIGS. 1-5, according to an embodiment.

Architecture 600 may be implemented in any mobile device for generating the features and processes described in reference to FIGS. 1-5, including but not limited to smart phones and wearable computers (e.g., smart watches, fitness bands). Architecture 600 may include memory interface 602, data processor(s), image processor(s) or central processing unit(s) 604, and peripherals interface 606. Memory interface 602, processor(s) 604 or peripherals interface 606 may be separate components or may be integrated in one or more integrated circuits. One or more communication buses or signal lines may couple the various components.

Sensors, devices, and subsystems may be coupled to peripherals interface 606 to facilitate multiple functionalities. For example, motion sensor(s) 610, light sensor 612, and proximity sensor 614 may be coupled to peripherals interface 606 to facilitate orientation, lighting, and proximity functions of the device. For example, in some embodiments, light sensor 612 may be utilized to facilitate adjusting the brightness of touch surface 646. In some embodiments, motion sensor(s) 610 (e.g., an accelerometer, rate gyroscope) may be utilized to detect movement and orientation of the device. Accordingly, display objects or media may be presented according to a detected orientation (e.g., portrait or landscape).

Haptic engine 617, under the control of haptic engine instructions 672, provides the features and performs the processes described in reference to FIGS. 1-5, such as, for example, implementing haptic feedback (e.g., vibration). Haptic engine 617 can include one or more actuators, such as piezoelectric transducers, electromechanical devices, and/or other vibration inducing devices that are mechanically connected to an input surface (e.g., touch surface 646). Drive electronics coupled to the one or more actuators cause the actuators to induce a vibratory response into the input surface, providing a tactile sensation to a user touching or holding the device.

Other sensors may also be connected to peripherals interface 606, such as a temperature sensor, a barometer, a biometric sensor, or other sensing device, to facilitate related functionalities. For example, a biometric sensor can detect fingerprints and monitor heart rate and other fitness parameters. In some implementations, a Hall sensing element in haptic engine 617 can be used as a temperature sensor.

Location processor 615 (e.g., GNSS receiver chip) may be connected to peripherals interface 606 to provide geo-referencing. Electronic magnetometer 616 (e.g., an integrated circuit chip) may also be connected to peripherals interface 606 to provide data that may be used to determine the direction of magnetic North. Thus, electronic magnetometer 616 may be used to support an electronic compass application.

Camera subsystem 620 and an optical sensor 622, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 624. Communication subsystem(s) 624 may include one or more wireless communication subsystems. Wireless communication subsystems 624 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and embodiment of the communication subsystem 624 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., Wi-Fi, Wi-Max, ZigBee™), 3G, 4G, 4G LTE, code division multiple access (CDMA) networks, near field communication (NFC), Wi-Fi Direct and a Bluetooth™ network. Wireless communication subsystems 624 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Figure 7A:
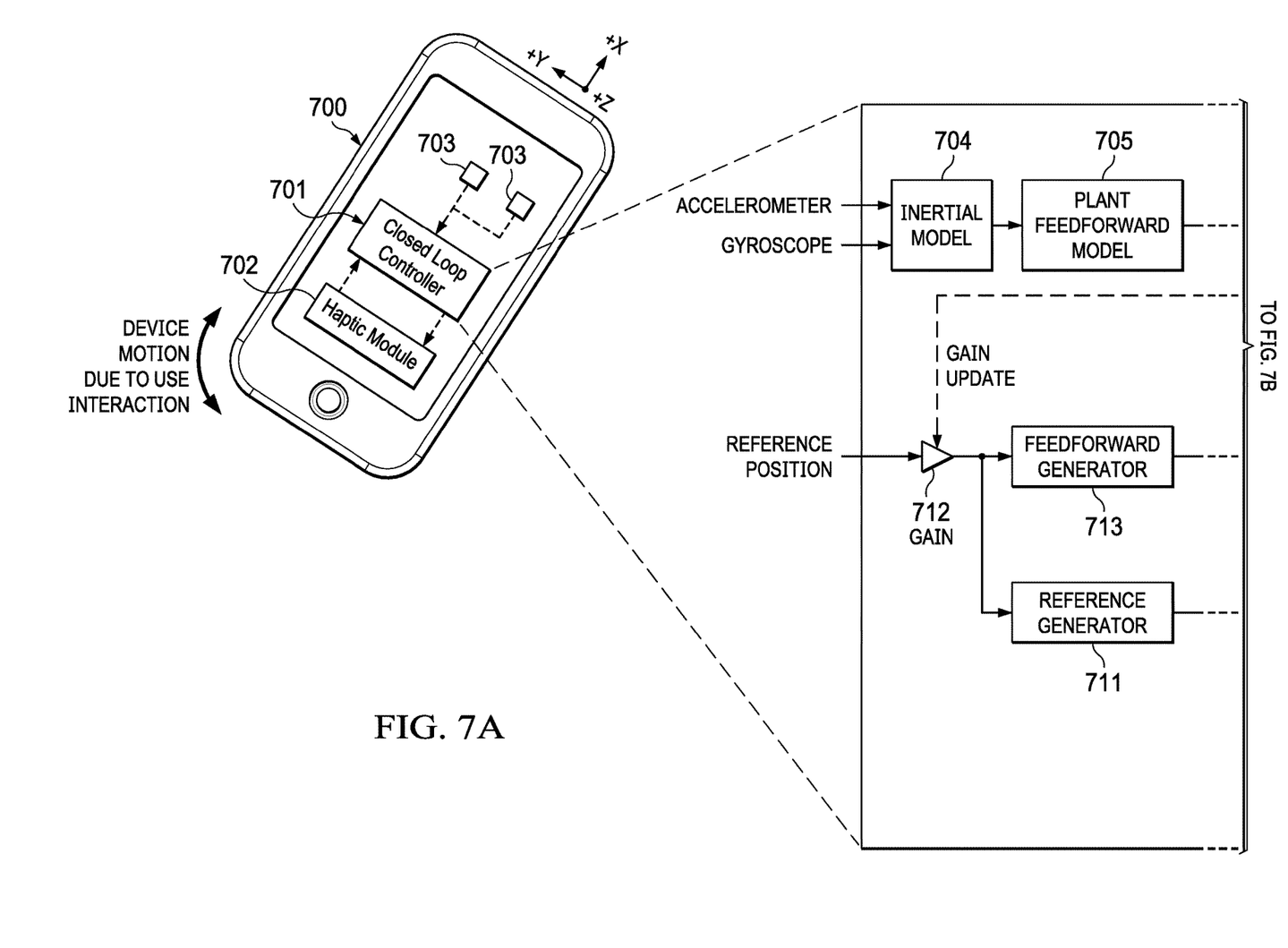
FIGS. 7A and 7B are block diagrams of a closed-loop LRA control system with inertial compensation, according to an embodiment.

Audio subsystem 626 may be coupled to a speaker 628 and one or more microphones 630 to facilitate voice-enabled functions, such as voice recognition, voice replication, digital recording, and telephony functions. In an embodiment, audio subsystem includes a digital signal processor (DSP) that performs audio processing, such as implementing codecs. In an embodiment, the audio DSP implements at least some portions of control system 700 described in reference to FIG. 7.

I/O subsystem 640 may include touch controller 642 and/or other input controller(s) 644. Touch controller 642 may be coupled to a touch surface 646. Touch surface 646 and touch controller 642 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 646. In one embodiment, touch surface 646 may display virtual or soft buttons and a virtual keyboard, which may be used as an input/output device by the user.

Other input controller(s) 644 may be coupled to other input/control devices 648, such as one or more buttons, rocker switches, thumb-wheel, infrared port, USB port, and/or a pointer device such as a stylus. The one or more buttons (not shown) may include an up/down button for volume control of speaker 628 and/or microphone 630.

In some embodiments, device 600 may present recorded audio and/or video files, such as MP3, AAC, and MPEG video files. In some embodiments, device 600 may include the functionality of an MP3 player and may include a pin connector for tethering to other devices. Other input/output and control devices may be used.

Memory interface 602 may be coupled to memory 650. Memory 650 may include high-speed random access memory or non-volatile memory, such as one or more magnetic disk storage devices, one or more optical storage devices, or flash memory (e.g., NAND, NOR). Memory 650 may store operating system 652, such as Darwin, RTXC, LINUX, UNIX, OS X, iOS, WINDOWS, or an embedded operating system such as VxWorks. Operating system 652 may include instructions for handling basic system services and for performing hardware dependent tasks. In some embodiments, operating system 652 may include a kernel (e.g., UNIX kernel).

Memory 650 may also store communication instructions 654 to facilitate communicating with one or more additional devices, one or more computers or servers, including peer-to-peer communications. Communication instructions 654 may also be used to select an operational mode or communication medium for use by the device, based on a geographic location (obtained by the GPS/Navigation instructions 668) of the device.

Memory 650 may include graphical user interface instructions 656 to facilitate graphic user interface processing, including a touch model for interpreting touch inputs and gestures; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GNSS/Navigation instructions 668 to facilitate GNSS (e.g., GPS, GLOSSNAS) and navigation-related processes and functions; camera instructions 670 to facilitate camera-related processes and functions; and haptic engine instructions 672 for commanding or controlling haptic engine 617 and to provide the features and performing the processes described in reference to FIGS. 1-5.

Each of the above identified instructions and applications may correspond to a set of instructions for performing one or more functions described above. These instructions need not be implemented as separate software programs, procedures, or modules. Memory 650 may include additional instructions or fewer instructions. Furthermore, various functions of the device may be implemented in hardware and/or in software, including in one or more signal processing and/or application specific integrated circuits (ASICs). Software instructions may be in any suitable programming language, including but not limited to: Objective-C, SWIFT, C # and Java, etc.

Closed-Loop Controller with Inertial Compensation

Figure 7B:
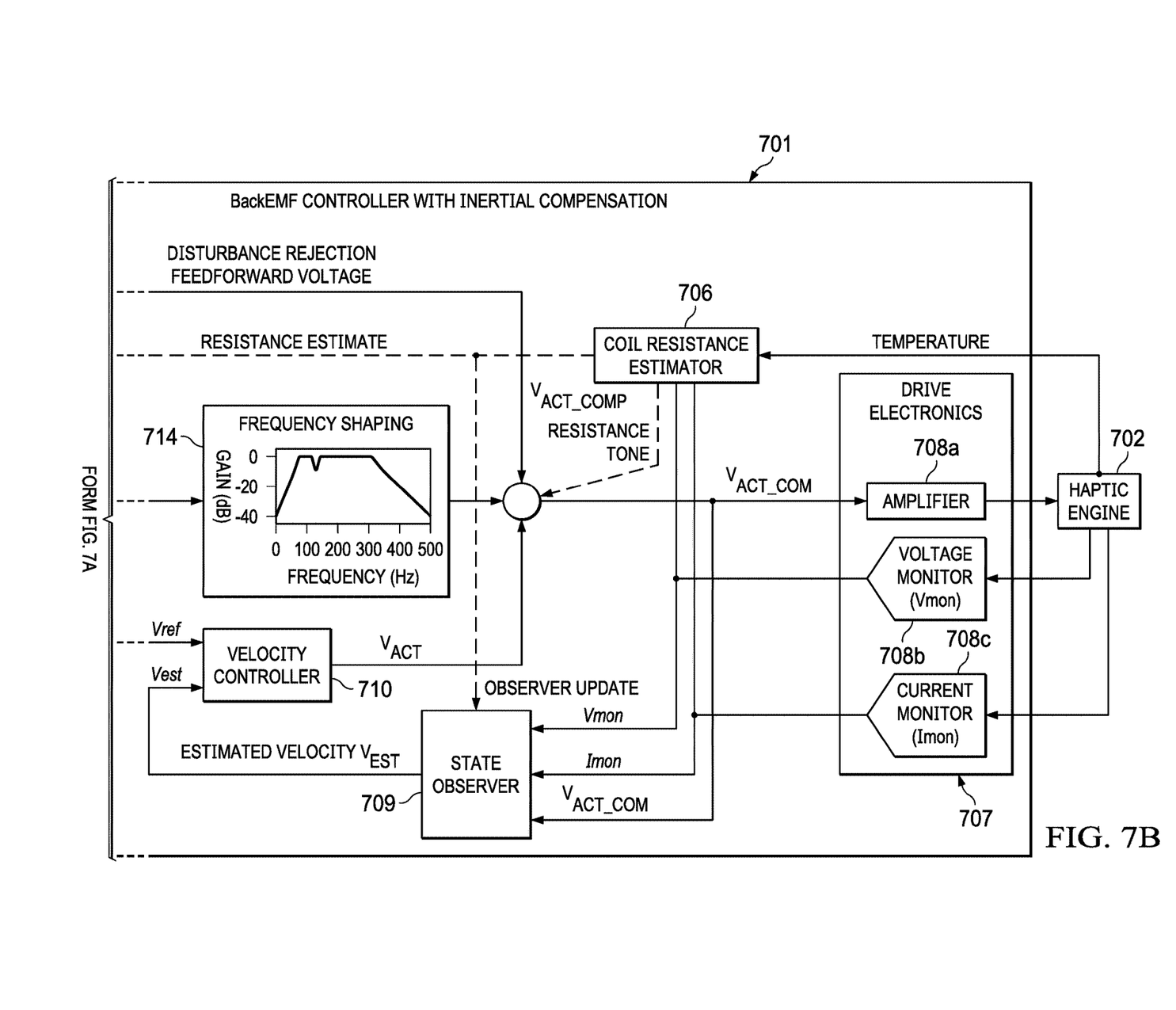

FIGS. 7A and 7B are block diagrams of a closed-loop LRA control system 701 with inertial compensation, according to an embodiment. When using Back EMF to control the motion of the LRA, it may be desirable to reject low frequency disturbances that can result in over travel or crashing of the mass. These low frequency disturbances can be caused by a user shaking or swinging the device housing the LRA (e.g., a smartphone). In an embodiment, low frequency inertial sensor signals (e.g., acceleration, angular rate) from onboard inertial sensors (e.g., accelerometers, gyroscopes) can be used with a feedforward model to compensate for the low frequency disturbances, providing a more robust closed-loop LRA control system.

Referring to FIGS. 7A and B, mobile device 700 (e.g., a smartphone) includes haptic module 702 (e.g., LRA 100), closed-loop controller 701 and inertial sensors 703a, 703b. Controller 701 further includes inertial model 704, plant feedforward model 705, coil resistance estimator 706, drive electronics 707, state observer 709, velocity controller 710, reference generator 711, gain module 712, feedforward generator 713 and frequency shaping module 714. Drive electronics 707 further includes amplifier 708a (e.g., a class D amplifier) and I/V monitoring circuits 708b, 708c (e.g., one or more ADCs).

Closed-loop controller 701 operates in a similar manner to controller 207 in system 200 (FIG. 2) but includes changes to the system architecture to include inertial compensation. Note that haptic engine 702 operates as previously described in reference to FIGS. 1 and 2, except that in this example embodiment, there are no magnetic sensors included in haptic engine 702 (e.g., no Hall sensors), and a separate temperature sensor is used to provide temperature readings to coil resistance estimator 706 rather than using the Hall sensor as a proxy temperature sensor. In other embodiments, controller 701 works with haptic engines that include one or more magnetic sensors, and where one or more magnetic sensors are also used to provide temperature estimates, such as previously described in reference to FIG. 2.

Figure 7C:
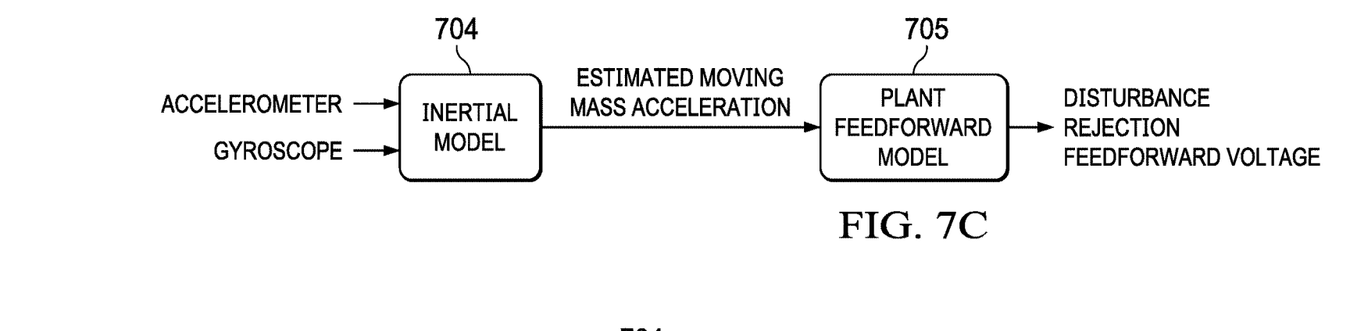
FIGS. 7C and 7D illustrate an inertial model and plant feed forward model for generating inertial compensation signals, according to an embodiment.
Figure 7D:
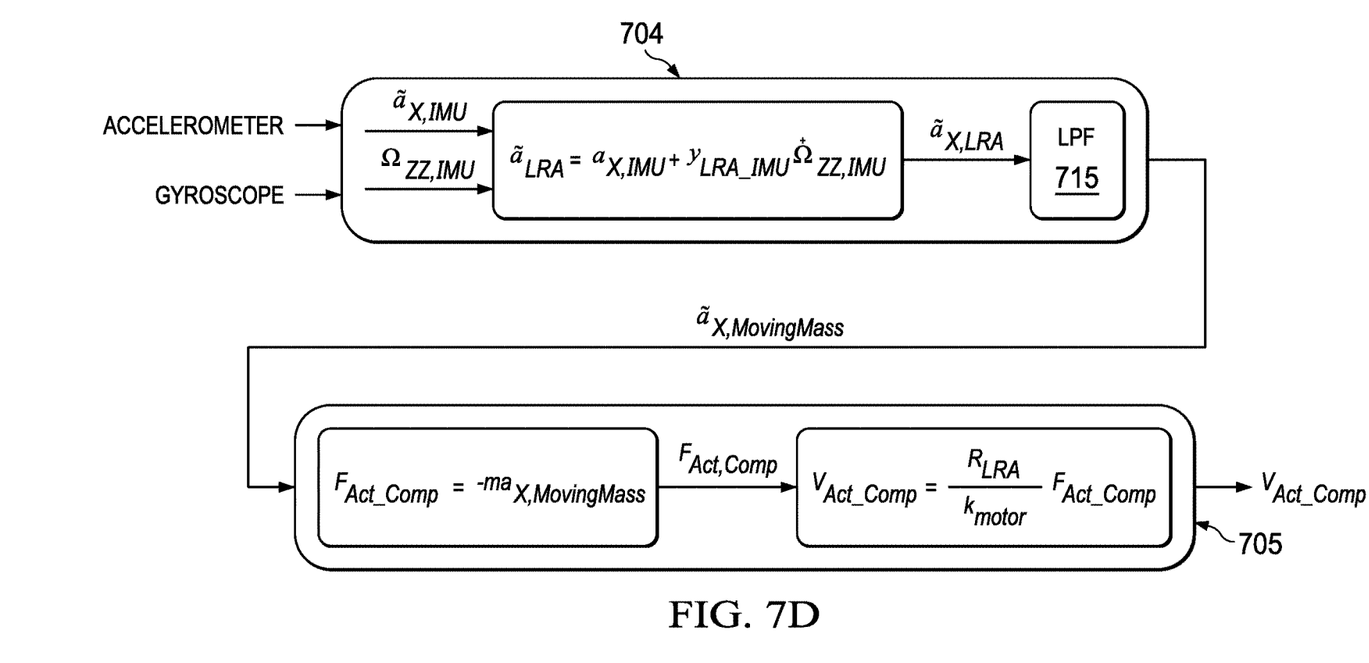

Inertial sensors (e.g., accelerometer, gyroscope) provide inertial sensor signals (e.g., acceleration, angle or angle rate data) to inertial model 704, which are described in reference to FIGS. 7C and 7D. The output of inertial model 704 is input into feedforward plant model 705, which generates a low-frequency, disturbance rejection feedforward voltage, also described in reference to FIGS. 7C and 7D.

A reference position for the moving mass of haptic engine 702 is input into gain module 712, where its gain is updated by the estimated coil resistance generated by coil resistance estimator 706 based on a temperature reading from a temperature sensor in LRA 702 and monitored coil current and monitor coil voltage $V_{mon}$, $I_{mon}$, provided by coil voltage monitor 708b and coil current monitor 708c, respectively.

The output of gain module 712 is input into feedforward generator 713 and reference generator 711. The output of feedforward generator 713 is a feedforward compensation signal (e.g., a voltage signal) that is input into frequency shaping module 714, and the output of reference generator 711 ($V_{ref}$) is input into velocity controller 710. Frequency shaping module 714 operates like a band pass audio equalizer, which specifically attenuates low frequency and high frequency contents outside of the actuator bandwidth and also around resonance frequency to generate a band-limited feedforward compensation signal. Feedforward generator 713 obtains the desired reference position of the moving mass and calculates the feedforward compensation signal to move the mass to the desired reference position based on an electromechanical model of the LRA. Reference generator 711 uses the desired reference position to estimate the desired reference velocity by, for example, differentiating the desired reference position.

Velocity controller 710 takes as inputs the velocity reference $V_{ref}$ from reference generator 711 and estimated velocity $V_{est}$ from state observer 709 and outputs an actuator control signal $V_{Act}$. State observer 709 takes as inputs the monitored coil voltage $V_{mon}$, the monitored coil current $I_{mon}$ and the estimated coil resistance $R_{LRA}$ and outputs the estimated mass velocity $V_{est}$.

The disturbance rejection feedforward compensation signal $V_{Act\_comp}$, the actuator control signal $V_{Act}$ and a resistance tone from coil resistance estimator 706 are combined to generate an actuator command signal $V_{Act\_com}$, which is provided to amplifier 708a (e.g., provided as a voltage signal) to adjust the coil current in the coils of LRA 702 to control the motion of the moving mass in the LRA. The resistance tone is optional in this design. Since it is a high frequency component (e.g., 750 Hz-2 kHz) outside the LRA bandwidth it does not generate motion. The monitored coil current and coil voltage (I/V) data coming from thermal model 206 (See FIG. 5) would band pass filter the measured current and voltage at the tone frequency by mixing it with the same tone, extracting I and Q (in-phase and quadrature) components and calculating coil resistance $R_{LRA}$ and coil inductance $L_{LRA}$.

FIGS. 7C and 7D illustrate an inertial model and plant feed forward model for generating an inertial compensation signal, according to an embodiment. Inertial model 704 receives sensor signals from an inertial measurement unit (IMU) (which includes accelerometers and gyroscopes). The sensor signals include acceleration $\tilde{a}_{x,IMU}$ and angular rate $\dot{\Omega}_{ZZ\_IMU}$). Inertial model 704 calculates the contribution of the sensor signals to the estimate of the moving mass linear acceleration $\tilde{a}_{X,LRA}$ along the movement axis (x-axis) using Equation [4]:

$$\tilde{a}_{X,LRA} = \tilde{a}_{x,IMU} + y_{LRA\_IMU} \dot{\Omega}_{ZZ\_IMU}, \qquad [4]$$

where $\tilde{a}_{X,LRA}$ is the estimated linear acceleration of the LRA along the movement axis x, $\tilde{a}_{x,IMU}$ is an estimated linear acceleration of the LRA mass based on accelerometer measurements along the movement axis x, $y_{LRA\_IMU}$ is a position (radius) vector for the y-axis offset of the IMU sensor from the LRA (a known value) and $\dot{\Omega}_{ZZ\_IMU}$ is the angular rate about the z-axis and is obtained from gyroscope measurements. The second term in Equation [4] provides the contribution of the angular rate around the z axis to the estimated linear acceleration of the LRA mass. Equation [4] assumes a right-handed reference coordinate system where the x-axis is directed out of the front of mobile device 700 (FIG. 7), the y-axis is directed out of the left-side of device 700 and the z-axis is directed out of the plane of mobile device to complete the right-handed reference coordinate system, as shown in FIG. 7A.

The estimated linear acceleration of the mass is input to low-pass filter (LPF) 715 to remove high frequency content from the estimated acceleration of the mass, resulting in a filtered estimate of the linear acceleration of the moving mass $\hat{a}_{X,MovingMass}$. The filtered estimate of linear acceleration is provided as input into plant feedforward model 705.

Plant feedforward model 705 calculates the force on the moving mass according to Equation [5]:

$$F_{Act\_Comp} = -m \cdot a_{X\_MovingMass}, \quad [5]$$

where m is the mass of the moving mass.

The force $F_{Act\_Comp}$ is then used to calculate the disturbance rejection feedforward voltage $V_{Act\_Comp}$ according to Equation [6]:

$$V_{Act\_Comp} = \frac{R_{LRA}}{k_{motor}} \cdot F_{Act\_Comp}, \quad [6]$$

where $R_{LRA}$ is the estimated coil resistance and $k_{motor}$ is a motor constant.

Figure 8:
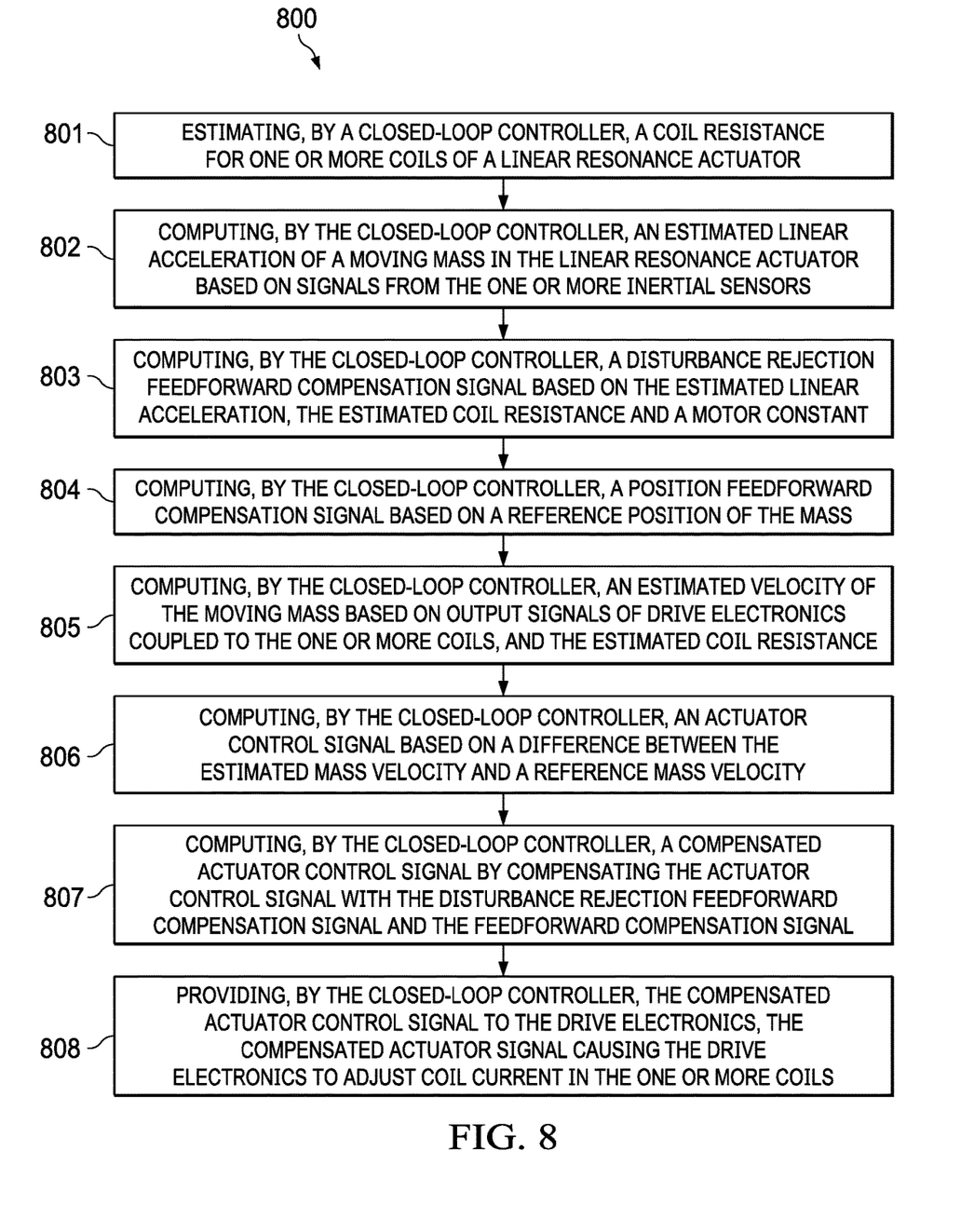
FIG. 8 is a flow diagram of an example process of closed-loop control of a moving mass with inertial compensation, according to an embodiment.

FIG. 8 is a flow diagram of an alternative example process 800 of closed-loop control of a moving mass of an LRA with inertial compensation, according to an embodiment. Process 800 can be implemented by, for example, the mobile architecture 600 described in reference to FIG. 6.

Process 800 begins by estimating, by a closed-loop controller, a coil resistance for one or more coils of a LRA (801). For example, the estimated resistance can be estimated from temperature readings from one or more temperature sensors in the LRA, or derived from signals from one or magnetic sensors (e.g., Hall sensors) in the LRA, as described in reference to FIGS. 2 and 4.

Process 800 continues by computing, by the closed-loop controller, an estimated linear acceleration of a moving mass in the LRA based on signals from the one or more inertial sensors (802). In an embodiment, the signals include acceleration data from accelerometers and angular rate data from gyroscopes.

Process 800 continues by computing, by the closed-loop controller, a disturbance rejection feedforward compensation signal based on the estimated linear acceleration, the estimated coil resistance and a motor constant (803).

Process 800 continues by computing, by the closed-loop controller, a position feedforward compensation signal based on a reference position of the mass (804).

Process 800 continues by computing, by the closed-loop controller, an estimated velocity of the moving mass based on output signals of drive electronics coupled to the one or more coils, and the estimated coil resistance (805). For example, a monitored coil voltage and coil current can be used with the estimated coil resistance to estimate mass velocity.

Process 800 continues computing, by the closed-loop controller, an actuator control signal based on a difference between the estimated mass velocity and a reference mass velocity (806). The reference mass velocity can be determined by, for example, differentiating a desired reference position.

Process 800 continues by computing, by the closed-loop controller, a compensated actuator control signal by compensating the actuator control signal with the disturbance rejection feedforward compensation signal and the feedforward compensation signal (807). In an embodiment, a resistance tone can be applied to the compensated actuator control signal, as described in reference to FIG. 7.

Process 800 continued by providing, by the closed-loop controller, the compensated actuator control signal to the drive electronics, the compensated actuator signal causing the drive electronics to adjust coil current in the one or more coils (808). For example, the drive electronics can adjust a voltage across the one or more coils to control the coil current through the one or more coils.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

APPENDIX A—EXAMPLE OBSERVER FORMULATION

The state equation for the Linear Resonance Actuator (LRA) is defined by:

$$\begin{cases} \frac{d}{dt}\begin{bmatrix} x \\ \dot{x} \\ I \end{bmatrix} = \begin{bmatrix} 0 & 1 & 0 \\ \frac{-k_M}{m} & \frac{-c_M}{m} & \frac{k_{motor}}{m} \\ 0 & \frac{-k_{motor}}{L} & \frac{-\hat{R}}{L} \end{bmatrix}\begin{bmatrix} x \\ \dot{x} \\ I \end{bmatrix} + \begin{bmatrix} 0 \\ 0 \\ \frac{1}{L} \end{bmatrix}V \\ \begin{bmatrix} I \\ V \end{bmatrix} = \begin{bmatrix} 0 & 0 & 1 \\ 0 & 0 & 0 \end{bmatrix}\begin{bmatrix} x \\ \dot{x} \\ I \end{bmatrix} + \begin{bmatrix} 0 \\ 1 \end{bmatrix}V \end{cases}$$

$$\begin{cases} \dot{X} = A_c X + B_c u \\ Y = C_c x + D_c u \end{cases}$$

Where:

$$\begin{cases} k_M, & \text{Spring constant} \\ c_M, & \text{Mechanical Damping} \\ k_{motor}, & \text{Motor Constant} \\ L, & \text{Inductance of Coil} \\ \hat{R}, & \text{Estimated Resistance from Temperature Sensor} \\ m, & \text{Mass} \end{cases}$$

Now state space in discrete domain:

$$\begin{cases} x[n+1] = A_d x[n] + B_d u[n] \\ y[n] = C_d x[n] + D_d u[n] \end{cases}$$

with the continuous to Discrete Transformation defined by:

$$A_d = e^{A_c T_s}, B_d = A_c^{-1}(A_d - 1)B_c, C_d = C_c, D_d = D_c$$

A Kalman filter (KF) is used to generate a fused estimate of two measurement signals:

$$\begin{cases} x[n], & \text{From hall } B_z \text{ measurement, } x[n] = F^{-1}(B_z) \\ i[n], & \text{Current Measurement} \end{cases}$$

We setup the KF as follows. These are the KF "time update" equations $$\hat{x}[n+1]^- = A_d \hat{x}[n] + B_d u[n]$$
$$P[n+1]^- = AP[n]A^T + Q$$
$$z[n+1] = Hx[n]$$

Where:

$$\begin{cases} (\hat{x}[n+1]^-)_{3\times 1}, & \text{State Estimate} \\ z[n]_{2\times 1}, & \text{Measurement (Position, Current)} \\ H_{2\times 3}, & \text{Output Transition matrix,} \begin{bmatrix} 1 & 0 & 0 \\ 0 & 0 & 1 \end{bmatrix} \\ Q_{3\times 3}, & \text{Process/Plant Noise Covariance, } 0_{3\times 3} \\ (P[n+1]^-)_{3\times 3}, & \text{Error covariance, } P[0] = I_{3\times 3} \end{cases}$$

Then we update the next state using:

$$K[n+1] = P[n+1]^- H^T (HP[n+1]^- H^T + R_\sigma)^{-1}$$
$$\hat{x}[n+1] = \hat{x}[n+1]^- + K[n+1](z[n+1] - H\hat{x}[n+1]^-)$$
$$P[n+1] = (I - K[n+1]H)P[n+1]^-$$

Where $$\begin{cases} K[n+1]_{3\times 2}, & \text{Kalman Gain} \\ (R_\sigma)_{2\times 2}, & \text{Measurement Noise Covariance Matrix} \\ (\hat{x}[n+1])_{3\times 1}, & \text{State after measurement update} \end{cases}$$

A fused estimate is obtained from $\hat{x}[n+1]$ which should be the optimal state estimate from position and current.

The formulation described above depends on a resistance estimate $\hat{R}$ obtained from the Hall sensor. Noise in the resistance estimate can be captured by using a plant/process noise covariance matrix $Q_{3\times 3}$ in the covariance update equation:

$$P[n+1]^{-1} = AP[n]A^T + Q.$$

What is claimed is:

1. A system comprising:
   a linear resonant actuator (LRA) including a frame, one or more coils mounted to the frame and operable to generate a magnetic field, and a mass including magnetic portions positioned within the frame and configured to move within the frame along a movement axis;
   drive electronics coupled to the linear resonant actuator (LRA) and to the one or more coils;
   one or more inertial sensors;
   a closed-loop controller coupled to the one or more inertial sensors and the drive electronics, the controller configured to:
   estimate a coil resistance of the one or more coils;
   compute an estimated linear acceleration of the mass based on signals from the one or more inertial sensors;
   compute a disturbance rejection feedforward compensation signal based on the estimated linear acceleration, the estimated coil resistance and a motor constant;
   compute a position feedforward compensation signal based on a reference position of the mass;
   compute an estimated velocity of the moving mass based on output signals of the drive electronics and the estimated coil resistance;
   compute an actuator control signal based on a difference between the estimated mass velocity and a reference mass velocity;
   compute a compensated actuator control signal by compensating the actuator control signal with the disturbance rejection feedforward compensation signal and the position feedforward compensation signal; and
   provide the compensated actuator control signal to the drive electronics, the compensated actuator signal causing the drive electronics to adjust coil current in the one or more coils.

2. The system of claim 1, wherein the one or more coils are mounted to the mass and the magnetic portions are mounted to the frame.

3. The system of claim 1, wherein the one or more inertial sensors include at least one accelerometer.

4. The system of claim 1, wherein the LRA includes one or more temperature sensors and the coil resistance is computed from temperature readings provided by the one or more temperature sensors.

5. The system of claim 4, wherein the LRA includes one or more magnetic sensors and the temperature readings are derived from signals output by the one or magnetic sensors in the LRA.

6. The system of claim 1, wherein the estimated linear acceleration is filtered using a low-pass filter to remove low frequency disturbances.

7. The system of claim 1, further comprising:
   a frequency shaping module configured to receive a gain adjusted reference position and output a band-limited position feedforward compensation signal.

8. The system of claim 1, wherein the controller is configured to implement a state observer for computing the estimated mass velocity based on a coil voltage, the coil current, the estimated coil resistance and the compensated actuator control signal.

9. The system of claim 1, wherein the output signals from the drive electronics include a measurement of the coil current.

10. The system of claim 1, wherein computing the compensated actuator control signal includes compensating the actuator control signal with the disturbance rejection feedforward compensation signal, the position feedforward compensation signal and a resistance tone.

11. A method comprising:
estimating, by a closed-loop controller, a coil resistance for one or more coils of a linear resonant actuator (LRA);
computing, by the closed-loop controller, an estimated linear acceleration of a mass in the LRA based on signals from one or more inertial sensors;
computing, by the closed-loop controller, a disturbance rejection feedforward compensation signal based on the estimated linear acceleration, the estimated coil resistance and a motor constant;
computing, by the closed-loop controller, a position feedforward compensation signal based on a reference position of the mass;
computing, by the closed-loop controller, an estimated velocity of the moving mass based on output signals of drive electronics coupled to the one or more coils, and the estimated coil resistance;
computing, by the closed-loop controller, an actuator control signal based on a difference between the estimated mass velocity and a reference mass velocity;
computing, by the closed-loop controller, a compensated actuator control signal by compensating the actuator control signal with the disturbance rejection feedforward compensation signal and the position feedforward compensation signal; and
providing, by the closed-loop controller, the compensated actuator control signal to the drive electronics, the compensated actuator signal causing the drive electronics to adjust coil current in the one or more coils.

12. The method of claim 11, wherein the one or more coils are mounted to the mass and magnetic portions are mounted to a frame of the LRA.

13. The method of claim 11, wherein the one or more inertial sensors include at least one accelerometer.

14. The method of claim 11, wherein temperature readings are provided by a temperature sensor in the LRA.

15. The method of claim 11, wherein temperature readings are derived from signals output by one or magnetic sensors in the LRA.

16. The method of claim 11, wherein the estimated linear acceleration is filtered using a low-pass filter to remove low frequency disturbances.

17. The method of claim 11, further comprising:
a frequency shaping module configured to receive a gain adjusted reference position and output a band-limited position feedforward compensation signal.

18. The method of claim 11, wherein the closed-loop controller is configured to implement a state observer for computing the estimated mass velocity based on a coil voltage, the coil current, the estimated coil resistance and the compensated actuator control signal.

19. The method of claim 11, wherein the output signals from the drive electronics include a measurement of the coil current.

20. The method of claim 11, wherein computing the compensated actuator control signal includes compensating the actuator control signal with the disturbance rejection feedforward compensation signal, the position feedforward compensation signal and a resistance tone.

* * * * *

UNITED STATES PATENT AND TRADEMARK OFFICE
CERTIFICATE OF CORRECTION

PATENT NO. : 10,601,355 B2
APPLICATION NO. : 16/147434
DATED : March 24, 2020
INVENTOR(S) : Hari Vasudevan et al.

Page 1 of 1

It is certified that error appears in the above-identified patent and that said Letters Patent is hereby corrected as shown below:

In the Claims

Column 17, Line 17, in Claim 11, before "mass" delete "moving".

Signed and Sealed this
Twenty-sixth Day of May, 2020

Andrei Iancu
*Director of the United States Patent and Trademark Office*